United States Patent Office 3,555,619
Patented Jan. 19, 1971

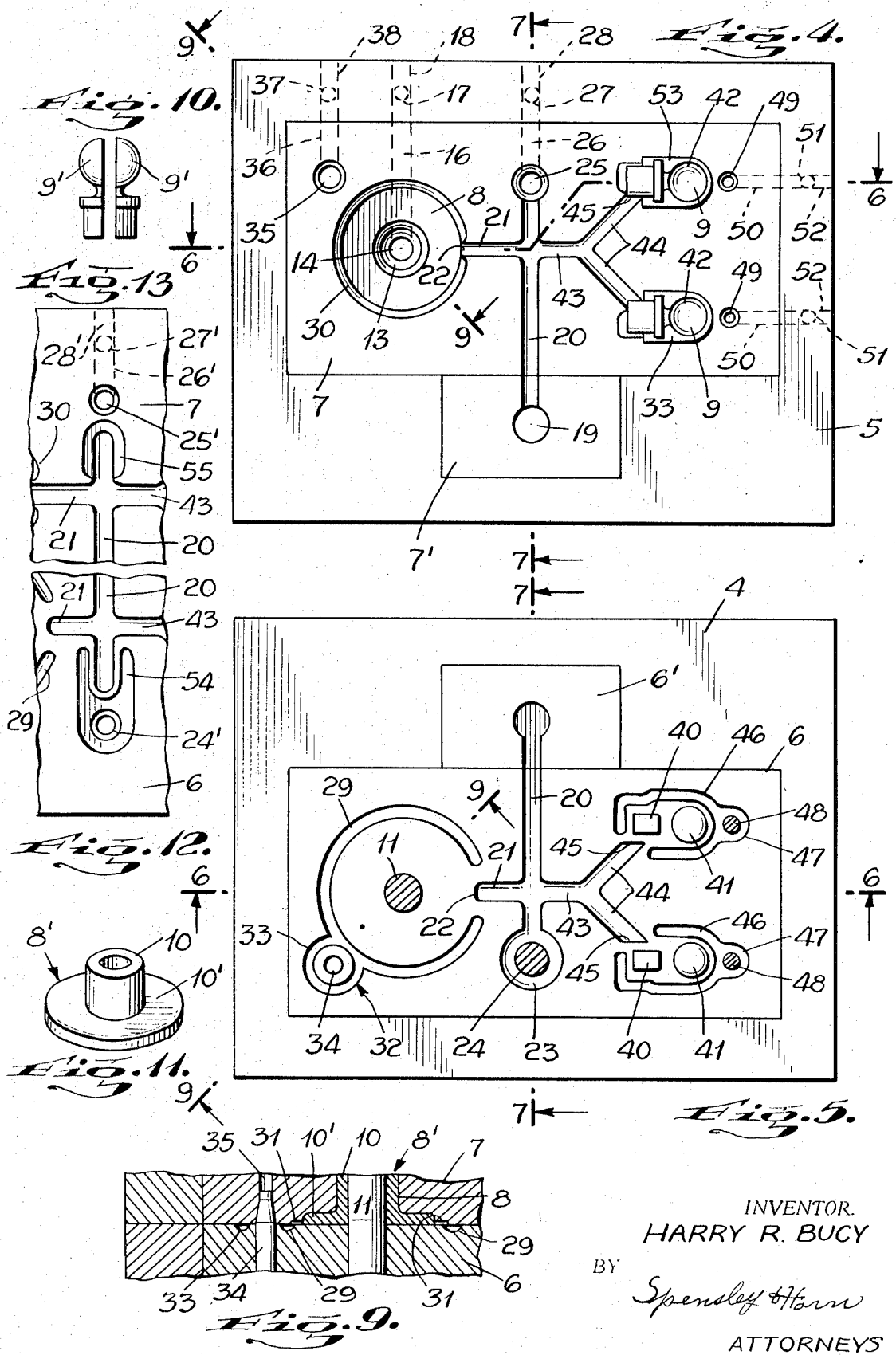

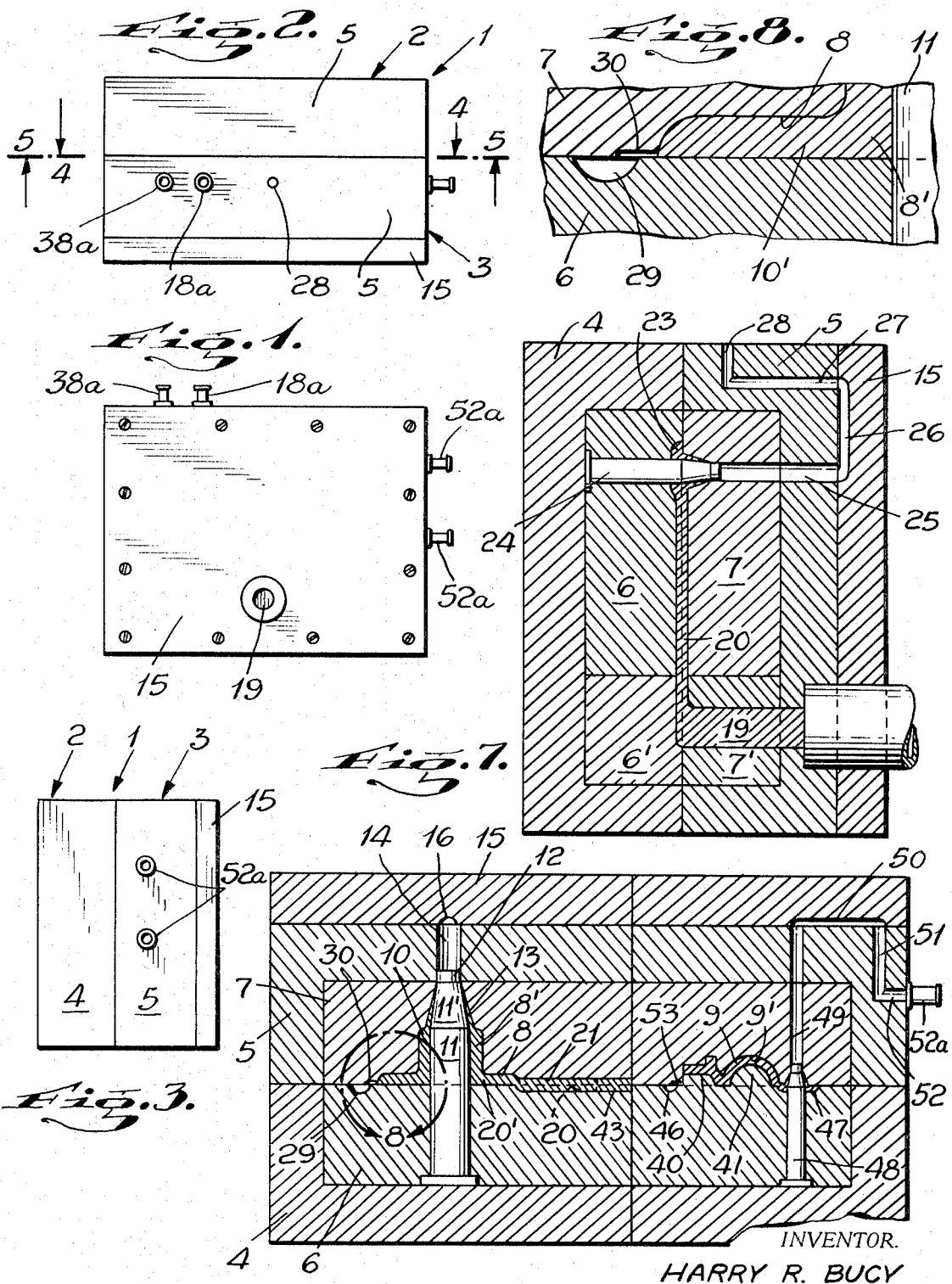

3,555,619
MOLD FOR PRESSURE INJECTED MOLTEN MATERIAL HAVING CAVITY WITH PERIPHERAL VENT
Harry R. Bucy, 625 S. Glenwood Place,
Burbank, Calif. 91506
Filed Oct. 17, 1967, Ser. No. 675,897
Int. Cl. B29f 1/022
U.S. Cl. 18—42                        11 Claims

ABSTRACT OF THE DISCLOSURE

A separable mold for pressure injected molten material characterized by the fact that the meeting faces of the mold halves adjacent to the periphery thereof are uninterrupted and by the fact that each cavity in the mold is separately vented by means including a groove in communication with atmosphere which substantially peripherally surrounds the cavity and is connected to the cavity by a longitudinally co-extensive narrow space between the groove and the cavity of such limited depth that only the air and gas displaced by the entering material can flow from the cavity into the groove and thence to atmosphere.

BACKGROUND OF THE INVENTION (I) Field of the invention

The invention relates to molds for pressure injected molten material and particularly to a mold capable of forming castings in which the formation of parting line flash is eliminated.

(II) Background of the invention

Prior to the advent of applicant's patents and applications hereinafter cited, the only known way of venting molds for pressure die casting metals and injection molding of plastics was a provision of narrow, shallow vents extending across the face of one or both of the mold halves as set forth in such books as;

Die Casting by Charles O. Herb, published by The Industrial Press, copyright 1952, second edition, page 70;

Die Casting by H. H. Doehler, published by McGraw-Hill Books, copyright 1951, pages 8 and 84 and chapter 10;

Tool Engineer's Handbook, published by McGraw-Hill Books, first edition, fifth printing 1953, copyright 1949, pages 400 and 440.

The patents and pending application of applicant relating to this art generally are as follows:

Patent 3,108,339 dated Oct. 29, 1963;
Patent 3,266,098 dated Aug. 16, 1966;
Patent 3,266,099 dated Aug. 16, 1966;
Application Ser. No. 496,368 filed Oct. 15, 1965.

In general, all of the prior art other than that of applicant's prior patents and applications, accepts the formation of flash at the parting line of pressure injected castings and moldings as a necessary evil and the only efforts have been to minimize it as much as possible.

SUMMARY OF THE INVENTION

Having the foregoing background of the field of invention in mind, applicant has consistently treated the formation of flash as unnecessary as will be noted in all of his prior patents and applications. Applicant's Pat. 3,108,339 and 3,226,098 are directed to molds which are completely sealed on the die faces but which allow for escape of air and gas from the mold cavity at points other than at the die faces while Pat. 3,266,099 relates to a specific self-sealing vent which still permits the sealing of the cavity with elimination of flash at all points except at the vent. Applicant's pending application Ser. No. 496,368 now Pat. No. 3,357,057 contemplates the complete sealing of the die surfaces while providing a novel means for complete evacuation of all cavities within the mold for the production of the highest possible quality of castings. The mold is costly to produce, but where high quality of casting is essential, the added cost is justified. Applicant's application Ser. No. 875,968 is directed to a mold which, like the said prior application, employes vacuum, but primarily to evacuate the sprue hole and runner system to the end that the only air to be positively displaced by the incoming molten material will not be more than that which occupies the mold cavities at ambient atmospheric pressure. It permtis a less costly mold to be made with assurance of a casting of average quality and without the formation of flash.

With these considerations in mind, the present invention is directed to a mold which, like the molds of applicant's prior applications, is concerned with the production of castings in which the formation of flash is eliminated and in which all air and gas is vented through means which do not violate the integrity of the meeting faces of the mold halves and in which no vacuum is employed. The molds of this invention may be used where the physical qualities of the castings are of secondary importance and where the elimniation of the cost of flash removal is an important cost consideration.

BRIEF DESCRIPTION OF DRAWINGS

In the drawings which illustrate a presently preferred embodiment of the invention;

FIG. 1 is a reduced scale elevational exterior view of the cover half side of a mold constituting a presently preferred embodiment of the invention;

FIG. 2 is a reduced scale top plan view of the mold shown in FIG. 1;

FIG. 3 is an end elevational view of the mold shown in FIGS. 1 and 2 as viewed from the right hand side of those figures;

FIG. 4 is an enlarged scale elevational view of the die face side of the cover half of the mold, the view being taken as on the line 4—4 of FIG. 2;

FIG. 5 is an enlarged scale elevational view of the die face side of the ejector half of the mold as viewed on the plane of the line 5—5 of FIG. 2;

FIG. 6 is a sectional view of the mold taken in the plane of the staggered lines 6—6 of FIGS. 4 and 5;

FIG. 7 is a transverse sectional view of the mold taken plane of the staggered lines 6—6 of FIGS. 4 and 5;

FIG. 8 is a greatly enlarged fragmentary sectional view of the area designated by the irregular boundary line 8 in FIG. 6;

FIG. 9 is a fragmentary sectional view taken in the plane of the lines 9—9 in FIGS. 4 and 5;

FIG. 10 is a side elevational view of a pair of castings formed in two of the mold cavities;

FIG. 11 is a perspective view of a casting formed in another of the mold cavities; and, FIGS. 12 and 13 are fragmentary elevational views of mating portions of the cover and ejector die faces showing the substitution of the peripheral vent principle of the invention for the so-called "breather" type associated with the mold runner system.

DESCRIPTION OF ILLUSTRATED EMBODIMENT

Referring to the drawings, the illustrated embodiment comprises a separable mold 1 including an ejector half 2 and a cover half 3, said halves, respectively including ejector and cover die shoes 4 and 5 in which die inserts 6 and 6' and 7 and 7' are contained. Since the use of such usual components as leader or guide pins and ejector pins are known and have no bearing on the present invention, they have been omitted from the drawings.

The illustrated mold as shown as having a first cavity 8 for forming the base flange element 8' shown in FIG. 11 and a pair of identical cavities 9, 9 for forming the two halves 9', 9' of a ball ornament shown in FIG. 10. The cavity 8 is formed wholly in the cover die insert 6, the said castings 8' comprising a sleeve portion 10 having an annular flange 10' at one end thereof. The interior surface of the sleeve portion of the casting 8' is formed by a cylindrical core element 11 secured in the ejector die insert 6 and said core extends through the cavity with which it is associated and extends beyond the cavity in a tapered end portion 11 which terminates in a cylindrical distal end 12. The cover die insert 6 is provided with a tapered hole 13 into which the core portion 11' extends and a straight bore 14 extends from the smaller end of the bore 13 through the remainder of the cover die insert 6 and the cover die shoe 5. The taper of the hole 13 is slightly greater than that of the portion 11 of the core member and the relative diameters of the distal end 12 of the core member and of the bore 14 is such when the mold is closed that the clearance therebetween forms an annular orfice so narrow as to permit the passage only of air and gas therethrough. This is discussed at length in my said prior Pat. 3,108,339 wherefore this and other similar constructions in the mold will be hereinafter referred to as "breathers" and the specific construction will not be described in detail.

Fixed to the outer end face of the cover die shoe of the mold is a plate 15 having a groove 16 on the face thereof facing the cover die shoe, said groove extending from a point in registry with the bore 14 towards an exterior side surface of the mold to a point in registry with a bore 17 extending through the die shoe at right angles to the groove and which communicate with a bore 18 emerging at the side surface of the die shoe whereby air being expelled from the mold cavities can escape to atmosphere past the narrow orfice of the breather and thence through the passage formed by the groove 16 and bores 17 and 18.

The molten material may be delivered to the cavity 8 through any suitable means as, for example, a sprue hole 19 in the cover half and thence through a main runner 20 and a laterally extending branch runner 21 through an interposed gate 22 at the juncture of the branch runner with the cavity. The main runner extends downstream of the juncture with the branch runner to a cavity 23 which formed in the cover die insert without the interposition of a gate. A breather core element 24 extends through the cavity 23 and cooperates with a bore 25 in the cover half to permit the passage of air and gas only to and from the cavity 23 and a groove 26 in the plate 16 affords communication between the outer end of the bore 25 and intersecting bores 27 and 28 leading to atmosphere.

Surrounding the cavity 8 except for the portion connected to the runner 21, and uniformly closely spaced from the perimeter of the cavity is a groove 29 here shown as formed in the ejector die insert face but which may be formed in either die face. Because of the length of the vent thus formed, the width can be reduced to an extent which would be impracticable for the narrow vents heretofore employed as described in the books above cited. The groove 29 is connected with atmosphere through an interposed breather means 32 (see FIG. 5) said breather means comprising a circular cavity 33 formed in the ejector die insert and overlapping the groove 29 together with a core element 34 which cooperates with a bore 35 to form a breather in said bore 35 at the outer end of the cover die meeting with a groove 36 in the cover plate 15 affording communication with the atmosphere through exhaust port means comprising intersecting holes 37 and 38.

In use, assuming that the mold is closed, the injected molten material will push the air ahead of it, the air escaping to atmosphere through the various vent means above described with a minimum of back pressure, it being noted that the integrity of the die faces is preserved and that the peripheral orfice is so thin that flash on the castings at the parting line of the dies is practically eliminated. Moreover, the extreme length of the vent formed by the land 30 gives the cavity an air escape capacity far beyond anything which could be achieved by the prior art vents described in the books above cited, wherefore, back pressure on the entering material is for all practical purposes, reduced to zero.

It will be appreciated that this system is not applicable merely to castings having an opening extending therethrough but can be applied to castings of any configuration. This is shown in the cavities at the right hand side of FIGS. 4, 5 and 6 in which a pair of smaller but identical cavities 9, 9 form the castings 9', 9'.

Each cavity constitutes one-half of a hollow ball ornament mounted on a hollow, cylindrical shank portion capable of being fitted into a tube supported by the flange member 8'. In accordance with ordinary molding practice, the core portions which form concave surfaces on the casting are formed on the ejector half and are shown as a semi-cylindrical core portion 40 forming the interior of the casting shank portion and a hemispherical core portion 41 forming the interior of the ball portion. The portions 42 of the cavity 9 forming the exterior surface of the casting are formed on the cover die. These two cavities are served by a branch runner 43 extending from the main runner 20 for a short distance and thence extending in diverging sub-branch runners 44, 44 to the gate portions 45 thereof at the edges of the respective cavities.

Substantially surrounding each cavity 9 and spaced therefrom is one each of a pair of grooves 46 formed on one of the die surfaces, preferably in the ejector die surface, at one point in its length, each groove is widened as at 47 to receive a breather core 48 extending outwardly from the ejector die face and having a tapered distal end which cooperates with a complementary bore 49 in the cover half to form a breather orfice. At their outer ends, the bores 49, 49 register with one end of each of a pair of grooves 50, 50 in the cover plate 15 which affords communication with intersecting bores 51 and 52 constituting exhaust port means leading to atmosphere. A portion of the die face surrounding each cavity 42 is relieved about .001"–.002" for a width which slightly overlaps the adjacent side of the groove 46 as at 53 to form a narrow vent space having a length substantially equal to the perimeter of the cavity and which, like the space 31 already referred, permits the complete and unresisting expulsion of air from the cavity by the entering molten material. Actually, the connected breathers may be dispensed with, but they serve as a secondary stop gap in the event that foreign matter between the die faces should prevent complete closure of the mold and thus permit the molten material to flow from the cavity into the grooves and thence into the passage to atmosphere.

Heretofore, as taught by any of the authorities above cited, the making of multiple cavity molds required very careful spacing of cavities and limiting of the cavities to either identical castings or at least those which were nearly identical or similar in volume of metal. Moreover, the cavities had to be carefully spaced to achieve and maintain uniform heat conditions throughout the mold. Still further, in prior art multiple cavity molds the possible number of cavities was limited by the fact that a portion of the periphery of each cavity was accessible for a vent to extend across the mold face to the mold periphery.

The present invention makes it possible to disregard those limitations to a great extent and permits the design of molds capable of having more cavities as well as for cavities having as wide a range in size as may be desired. Still further, the exit points for the conduit leading from the various grooves may be placed at any point on the exterior surface of the mold that is most convenient. Other variations are believed to be obvious. For example, the equivalent of the grooves formed in the cover plate 15 might equally well be formed in the rear face of the cover half die shoe and in some cases, where the mounting of the mold did not interfere, the bores leading from the breathers could extend out through the cover die shoe rear surface and the cover plate be dispensed with.

Still another advantage of the present invention deriving from the fact that each cavity is supplied with its own "breather" vent is that where the invention is applied to a multiple cavity mold having perhaps as many as ten to thirty or more cavities certain of the breathers may be connected separately to sources of low degrees of vacuum to stabilize the flow of molten material to an orderly and complete filling of cavities. For this purpose any suitable source of vacuum may be employed so long as the magnitude applied to those breather orifices is capable of individual adjustment. This possibility is indicated on the drawings by the hose nipples 18a, 38a and 52a indicating capacity for optional conduit connections of the holes 18, 38 and 52 with sources of vacuum.

Referring finally to FIGS. 12 and 13, there is shown a modification in which the runner breather cavity 23 is dispensed with and the end of the runner downstream of the branch runners is bordered by a groove 54 spaced therefrom in the same manner as the grooves 29 and 46. This groove is widened at one point to receive the breather core 24 which cooperates with a bore 25, cover plate groove 26' and bores 27' and 28" to provide communication with atmosphere. Additionally, the die face opposite the groove 54 is provided with a land 55 extending from the edge of the runner to a point overlapping the groove 54 providing a long narrow orifice for the escape of air and gas from the runner.

An important advantage of this particular form of mold is that castings having no burr or flash at the parting line are readily produced by a mold which is economical to build although, as stated above, the system is not to be preferred where structural quality is a essential factor in the resulting casting. Generally, whatever cleaning up of castings is necessary can be achieved by an inexpensive tumbling operating and the cost of trimming dies and a trimming press operation is, of course, completely eliminated.

While in the foregoing specification a presently preferred embodiment of the invention has been disclosed by way of example, the invention is not to be deemed to be limited to the precise details of construction thus disclosed and it will be understood that the invention includes as well all such changes and modifications in the parts and in the construction, combination and arrangement of parts as shall come within the purview of the appended claims.

I claim:
1. In a mold comprising halves separable on a parting line defined by the opposing faces thereof and combining to form a cavity for forming a casting from molten material injected into the cavity under pressure, means for conveying molten material into the cavity from a source exteriorly of the mold including a runner means defined by the meeting faces of the mold halves and communicating with said cavity, means for facilitating the entry of the molten material into said runner means comprising an air and gas venting means including an orifice affording connection with said runner means at a point on said runner means remote from the point of entrance of the molten material into the runner means, said venting means being operative to discharge air and gas expelled from the runner means by the advancing molten material at a point on the exterior of the mold not involving the juncture of the mold parting line with the exterior surface of the mold, said orifice being operative to permit the passage only of air and gas from said runner means at all times other than when the portion of the runner means adjacent to said orifice is filled with injected material.

2. A mold as claimed in claim 1 in which the die face of at least one of said halves is provided with a plurality of cavities, in which said runner means includes a main runner into which the molten material is injected and at least one branch runner extending from said main runner to at least one of said cavities, and in which said orifice of said venting means is disposed at the side of the juncture of said main runner and said branch runner which is remote from the point of injection of molten material into said runner means.

3. A mold as claimed in claim 1 in which said orifices is formed by portions of the opposed surfaces of the mold halves incident to closing of the mold.

4. A mold as claimed in cliam 1 including an additional venting means connected to said cavity and operative to permit the egress of air and gas only displaced by the entry of the molten material into the cavity and said additional venting means including a passage means which maintains the integrity of the opposed die faces and emerges on an exterior surface of the mold.

5. A mold as claimed in claim 4 in which said passage means includes an orifice adjacent to said cavity through which air and gas only can pass.

6. A mold as claimed in claim 5 in which said orifice is formed by portions of the opposed surfaces of the mold halves as an incident to closing of the mold.

7. A mold as claimed in claim 1 in which said mold halves define a plurality of cavities, in which said runner means comprises a main runner and a plurality of branch runners connecting said cavities to said runner, and in which each of said cavities is provided with a separate, additional venting means each operative to permit the egress of air and gas only displaced by the entry of the molten material into the cavity associated therewith, and each of said additional venting means including a passage means which maintains the integrity of the opposed die faces and terminates in an exhaust orifice on an exterior surface of the mold.

8. A mold as claimed in claim 7 in which each of said passages includes an orifice adjacent to the associated cavity through which only air and gas can flow.

9. A mold as claimed in claim 7 in which the exhaust orifice of at least one of said passage means is optionally connectable to a source of vacuum.

10. A mold as claimed in claim 8 in which said orifices are formed by portions of the opposed surfaces of the mold halves as an incident to closing of the mold.

11. In a mold comprising halves separable on a parting line defined by the opposing faces thereof and combining to form a cavity for forming a casting from molten material injected into the cavity under pressure, means for conveying molten material into the cavity from a source exteriorly of the mold including a runner means defined by the meeting faces of the mold halves, air and gas venting means for facilitating the entry of the molten material into the cavity including a passage formed by the juxtaposed faces of the mold halves and extending spaced from and parallel to at least a portion of the periphery of the mold cavity, a narrow orifice extending between said passage and the cavity through which only air and gas can pass and extending substantially longitudinally co-extensive of said passage, and air and gas conduit means leading from said passage and through one of said mold halves to an exhaust orifice on the exterior of the mold; said runner means is provided with a separate venting means including a conduit means connected to said runner means by an orifice through which only air and gas can pass, said conduit maintaining the integrity of the meeting faces of the mold halves and terminating in an exhaust orifice on an exterior surface of the mold.

References Cited

UNITED STATES PATENTS

| 2,976,571 | 3/1961 | Moslo. | |
| 3,070,857 | 1/1963 | Venus | 164—347X |
| 3,108,339 | 10/1963 | Bucy | 18—42X |

H. A. KILBY, Jr., Primary Examiner

U.S. Cl. X.R.

18—30